US012597159B2

(12) United States Patent
Murayama et al.

(10) Patent No.: US 12,597,159 B2
(45) Date of Patent: Apr. 7, 2026

(54) SYSTEM, INFORMATION PROCESSING APPARATUS, METHOD, AND COMPUTER-READABLE MEDIUM

(71) Applicant: NEC Corporation, Tokyo (JP)

(72) Inventors: Kotaro Murayama, Tokyo (JP); Yasuhiro Mizukoshi, Tokyo (JP); Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 362 days.

(21) Appl. No.: 18/269,178

(22) PCT Filed: Dec. 25, 2020

(86) PCT No.: PCT/JP2020/048844
§ 371 (c)(1),
(2) Date: Jun. 22, 2023

(87) PCT Pub. No.: WO2022/137541
PCT Pub. Date: Jun. 30, 2022

(65) Prior Publication Data
US 2024/0054674 A1    Feb. 15, 2024

(51) Int. Cl.
*G06K 9/00* (2022.01)
*B60Q 9/00* (2006.01)
(Continued)

(52) U.S. Cl.
CPC ................. *G06T 7/73* (2017.01); *B60Q 9/00* (2013.01); *G06V 20/59* (2022.01); *G06V 40/103* (2022.01);
(Continued)

(58) Field of Classification Search
CPC ............. G06T 7/73; G06T 2207/10016; G06T 2207/30196; G06T 2207/30268;
(Continued)

(56) References Cited

U.S. PATENT DOCUMENTS 9,511,730 B1 * 12/2016 Wu ....................... G06V 20/597
10,528,804 B2 * 1/2020 Arata ................... G06V 40/107
(Continued)

FOREIGN PATENT DOCUMENTS

JP      2016062414 A  * 4/2016  ............. G06B 25/00
JP      2019-125345 A     7/2019
(Continued)

OTHER PUBLICATIONS

International Search Report for PCT Application No. PCT/JP2020/048844, mailed on Mar. 16, 2021.
(Continued)

*Primary Examiner* — Shervin K Nakhjavan
(74) *Attorney, Agent, or Firm* — Sughrue Mion, PLLC

(57)            ABSTRACT
A skeleton information acquisition means analyzes an in-vehicle video acquired from a camera that captures an image of a vehicle interior of a moving object, and acquires skeleton information of each of one or more passengers boarding on the moving object. A holding determination means determines whether the passenger is holding a pole, based on skeleton information of the passenger and a position of the pole in the moving object. An alert output means outputs an alert when it is determined that the passenger is not holding the pole.

18 Claims, 10 Drawing Sheets

(51) Int. Cl.

| | | |
|---|---|---|
| *G06T 7/73* | | (2017.01) |
| *G06V 20/59* | | (2022.01) |
| *G06V 40/10* | | (2022.01) |

(52) U.S. Cl.
CPC .. *G06V 40/107* (2022.01); *G06T 2207/10016* (2013.01); *G06T 2207/30196* (2013.01); *G06T 2207/30268* (2013.01)

(58) Field of Classification Search
CPC ........ B60Q 9/00; G06V 20/59; G06V 40/103; G06V 40/107; G08B 21/0476; G08B 21/0423
See application file for complete search history.

(56) References Cited

U.S. PATENT DOCUMENTS

| | | | | |
|---|---|---|---|---|
| 11,250,280 B2 * | 2/2022 | Kim | ...................... | G06V 20/593 |
| 11,688,095 B2 * | 6/2023 | Fujii | ........................ | G06T 7/73 |
| | | | | 382/103 |
| 11,995,536 B2 * | 5/2024 | Kawaguchi | ........... | G06F 18/217 |
| 2017/0193290 A1 * | 7/2017 | Yasunaga | .............. | G06V 40/28 |
| 2017/0316255 A1 | 11/2017 | Arata | | |
| 2018/0232903 A1 * | 8/2018 | Kawaguchi | .............. | G06T 7/75 |
| 2020/0180528 A1 * | 6/2020 | Kim | ................. | B60W 50/0098 |
| 2020/0242380 A1 * | 7/2020 | Darnaud | ................ | G06V 20/59 |
| 2021/0110182 A1 * | 4/2021 | Darnaud | ................ | G06V 20/64 |
| 2022/0144200 A1 * | 5/2022 | Taoka | ............... | B60R 21/01552 |
| 2023/0322173 A1 * | 10/2023 | Park | ....................... | G06V 10/82 |
| | | | | 701/36 |

FOREIGN PATENT DOCUMENTS

| | | | | | |
|---|---|---|---|---|---|
| JP | 2020003936 A | * | 1/2020 | ............ | B60R 11/04 |
| JP | 2020-138701 A | | 9/2020 | | |
| JP | 2020185985 A | * | 11/2020 | ............ | B60K 28/02 |

OTHER PUBLICATIONS

Extended European Search Report for EP Application No. EP20967027.2 dated on Dec. 19, 2023.

* cited by examiner

SYSTEM, INFORMATION PROCESSING APPARATUS, METHOD, AND COMPUTER-READABLE MEDIUM

This application is a National Stage Entry of PCT/JP2020/048844 filed on Dec. 25, 2020, the contents of all of which are incorporated herein by reference, in their entirety.

TECHNICAL FIELD

The present disclosure relates to a system, an information processing apparatus, a method, and a computer-readable medium.

BACKGROUND ART

As a related art, Patent Literature 1 discloses an in-vehicle monitoring apparatus that prevents a passenger in a vehicle from falling down in public passenger transportation. The in-vehicle monitoring apparatus described in Patent Literature 1 is mounted on a vehicle, such as a bus, that transports a passenger in a state of sitting or standing. The vehicle includes a plurality of in-vehicle cameras and various kinds of in-vehicle sensors. The in-vehicle camera captures an image of a seat, a passenger, baggage, and the like in the vehicle. The in-vehicle monitoring apparatus tracks movement of a passenger from the passenger getting on a bus to moving at a boarding position, by using a video of the in-vehicle camera.

In Patent Literature 1, the in-vehicle sensor includes an ultrasonic sensor, a pressure sensor, and a contact sensor. The ultrasonic sensor is used for detecting a position and a pose of a passenger in a vehicle. The pressure sensor is installed in a seat surface of a seat, and is used for detecting whether a passenger is sitting on the seat. In addition, the pressure sensor or the contact sensor is installed in a strap and a handrail, and is used for detecting whether a passenger is holding on to the handrail or the strap.

The in-vehicle monitoring apparatus grasps a boarding state of a passenger in a vehicle by using the in-vehicle camera and the in-vehicle sensor. In addition, the in-vehicle monitoring apparatus grasps a traveling state of the vehicle by using an out-of-vehicle camera and a vehicle sensor. The in-vehicle monitoring apparatus determines a risk level indicating a risk of a passenger falling, based on the boarding state of the passenger and a traveling state of the vehicle.

The in-vehicle monitoring apparatus performs notification related to safety of a passenger according to the risk level. For example, the in-vehicle monitoring apparatus converts an image captured by using the in-vehicle camera into an overhead image, and displays the converted image on a monitor. The in-vehicle monitoring apparatus displays, on a display screen of the monitor, each of a passenger sitting, a passenger standing on an aisle, and a passenger not moving for a long time, with different marks. In addition, the in-vehicle monitoring apparatus displays a passenger standing on the aisle with holding on to a handrail or a strap and a passenger standing on the aisle without holding on to the handrail or the strap, in a distinguished manner.

CITATION LIST

Patent Literature

[Patent Literature 1] Japanese Unexamined Patent Application Publication No. 2016-062414

SUMMARY OF INVENTION

Technical Problem

In riding bus business, a driver visually confirms whether a passenger is in a stable pose, that is, whether a standing passenger is holding on to a pole or the like. There is a possibility that a need for stable pose determination of a passenger increases as one axis of passenger watching which focuses on not only current manual driving by a driver but also a future autonomous driving age.

The in-vehicle monitoring apparatus described in Patent Literature 1 displays a boarding state of each passenger on a monitor. By referring to the monitor, a driver can grasp a passenger not holding on to a handrail or a strap, or the like. However, in Patent Literature 1, a sensor such as a contact sensor is installed in a handrail and a strap, and the in-vehicle monitoring apparatus determines, by using the sensor, whether a passenger is holding on to the handrail or the strap. Therefore, in Patent Literature 1, a sensor needs to be installed in all handrails or straps that can be held by a passenger.

In view of the above circumstances, an object of the present disclosure is to provide a system, an information processing apparatus, a method, and a computer-readable medium that are capable of determining whether a passenger is holding a pole without installing a sensor such as a contact sensor in each of a plurality of places where a passenger may hold.

Solution to Problem

In order to achieve the above object, the present disclosure provides, as a first aspect, an information processing apparatus. The information processing apparatus includes: a skeleton information acquisition means for analyzing an in-vehicle video acquired from a camera that captures an image of a vehicle interior of a moving object, and acquiring skeleton information of each of one or more passengers boarding on the moving object; a holding determination means for determining whether the passenger is holding a pole, based on skeleton information of the passenger and a position of the pole in the moving object; and an alert output means for outputting an alert when it is determined that the passenger is not holding the pole.

The present disclosure provides, as a second aspect, a system. The system includes a moving object having a camera that captures an image of a vehicle interior, and an information processing apparatus that monitors a passenger of a moving object. The information processing apparatus includes: a skeleton information acquisition means for analyzing an in-vehicle video acquired from the camera, and acquiring skeleton information of each of one or more passengers boarding on the moving object; a holding determination means for determining whether the passenger is holding a pole, based on skeleton information of the passenger and a position of the pole in the moving object; and an alert output means for outputting an alert when it is determined that the passenger is not holding the pole.

The present disclosure provides, as a third aspect, an information processing method. The information processing method includes: analyzing an in-vehicle video acquired from a camera that captures an image of a vehicle interior of a moving object, and acquiring skeleton information of each of one or more passengers boarding on the moving object; determining whether the passenger is holding a pole, based on skeleton information of the passenger and a position of the pole in the moving object; and outputting an alert when determining that the passenger is not holding the pole.

The present disclosure provides, as a fourth aspect, a computer-readable medium. The computer-readable medium stores a program for causing a processor to execute processing of: analyzing an in-vehicle video acquired from a camera that captures an image of a vehicle interior of a moving object, and acquiring skeleton information of each of one or more passengers boarding on the moving object; determining whether the passenger is holding a pole, based on skeleton information of the passenger and a position of the pole in the moving object; and outputting an alert when determining that the passenger is not holding the pole.

Advantageous Effects of Invention

A system, an information processing apparatus, a method, and a computer-readable medium according to the present disclosure can determine whether a passenger is holding a pole without installing a sensor such as a contact sensor in each of a plurality of places where the passenger may hold.

EXAMPLE EMBODIMENT

Figure 1:
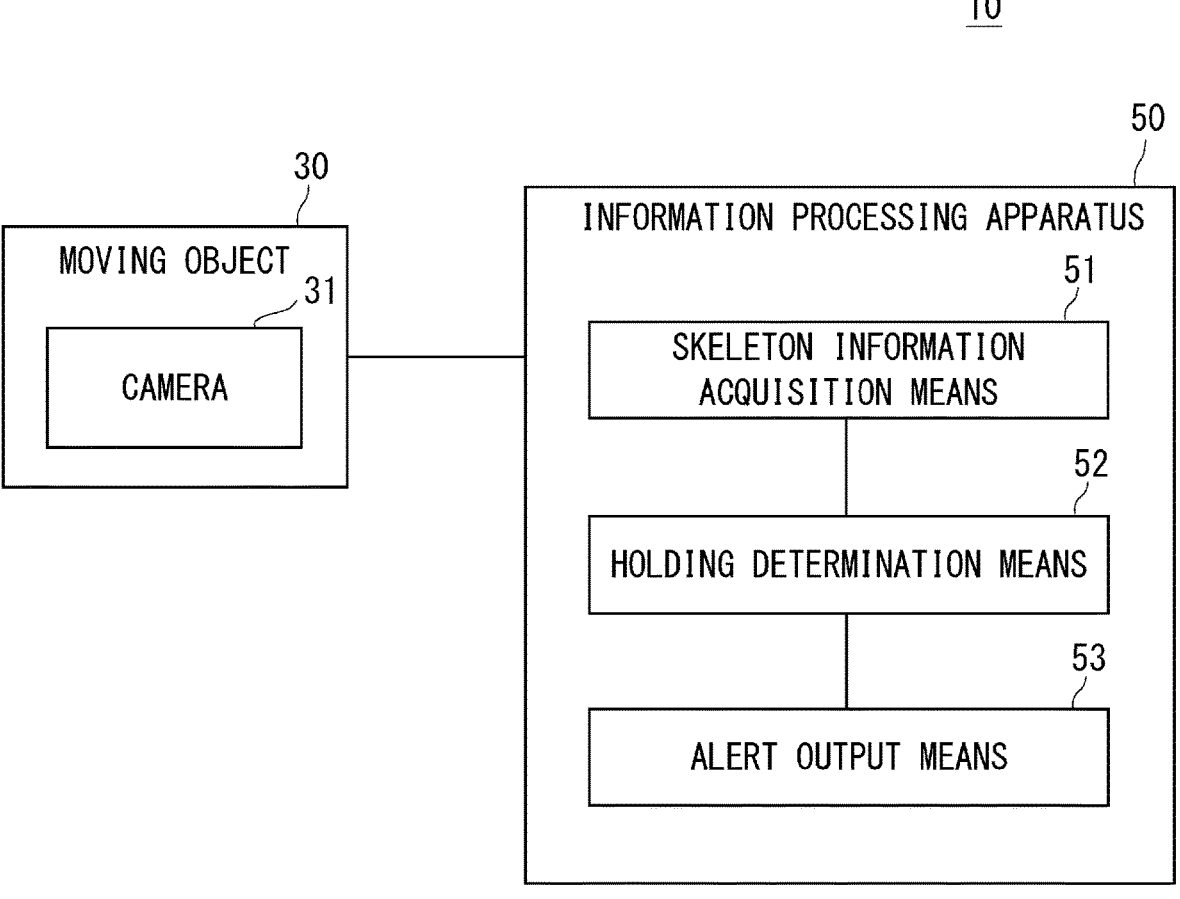
FIG. 1 is a block diagram illustrating a system according to the present disclosure.

Prior to the description of example embodiments of the present disclosure, an outline of the present disclosure will be described. FIG. 1 illustrates a system according to the present disclosure. A system 10 includes a moving object 30 and an information processing apparatus 50. The moving object 30 includes a camera 31 that captures an image of a vehicle interior. The information processing apparatus 50 monitors a passenger boarding on the moving object 30. The information processing apparatus 50 includes a skeleton information acquisition means 51, a holding determination means 52, and an alert output means 53.

The skeleton information acquisition means 51 analyzes an in-vehicle video acquired from the camera 31, and acquires skeleton information of each of one or more passengers boarding on the moving object 30. The holding determination means 52 determines whether a passenger is holding a pole, based on the skeleton information of the passenger and a position of the pole in the moving object 30. The alert output means 53 outputs an alert when it is determined that the passenger is not holding the pole.

In the present disclosure, the holding determination means 52 determines whether a passenger is holding a pole by using the skeleton information of the passenger acquired from a video of the camera 31. In the present disclosure, a video of the camera 31 is used for determination of whether a passenger is holding a pole. Therefore, the present disclosure can determine whether a passenger is in a safe boarding pose without installing a sensor such as a contact sensor at each of a plurality of places where the passenger may hold. The information processing apparatus 50 outputs an alert when it is determined that a passenger is not holding a pole. In this way, the information processing apparatus 50 can contribute to safe operation of the moving object 30.

Figure 2:
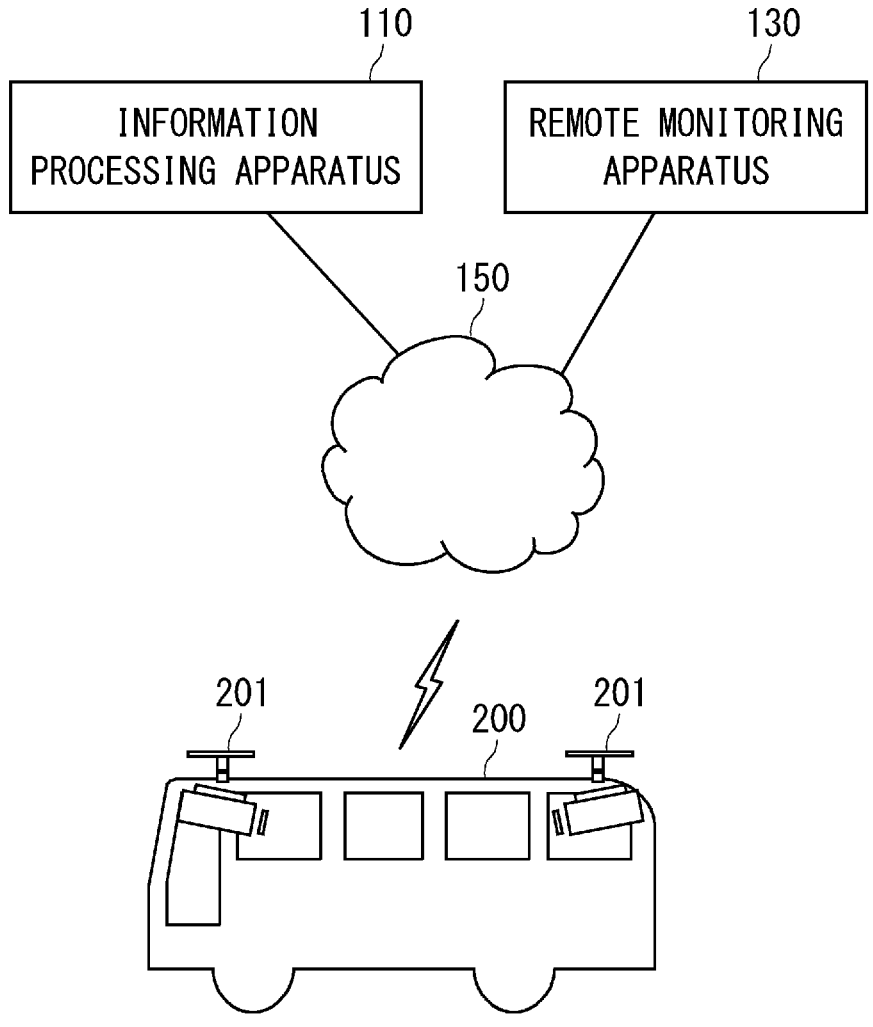
FIG. 2 is a block diagram illustrating a system according to a first example embodiment of the present disclosure.

Hereinafter, the example embodiments of the present disclosure will be described in detail. FIG. 2 illustrates a system according to a first example embodiment of the present disclosure. A system (passenger monitoring system) 100 includes an information processing apparatus 110, a remote monitoring apparatus 130, and a moving object 200. In the system 100, the information processing apparatus 110 and the remote monitoring apparatus 130 are connected to the moving object 200 via a network 150. The network 150 includes, for example, a wireless communication network by using a communication line standard such as long term evolution (LTE). The network 150 may include a wireless communication network such as WiFi (registered trademark) or a fifth generation mobile communication system. The system 100 corresponds to the system 10 illustrated in FIG. 1.

The moving object 200 is configured as, for example, a vehicle such as a riding bus that travels with a passenger boarding thereon. The moving object 200 is not limited to a riding bus, and may be a vehicle, such as a street train, on which a passenger can stand and board. The moving object 200 includes one or more in-vehicle cameras 201 that capture an image of a vehicle interior. In FIG. 2, an example in which the moving object 200 includes two in-vehicle cameras 201 that capture the vehicle interior from a front and a back of the vehicle is illustrated. The moving object 200 corresponds to the moving object 30 illustrated in FIG. 1. The in-vehicle camera 201 corresponds to the camera 31 illustrated in FIG. 1.

The information processing apparatus 110 is an apparatus that monitors a passenger of the moving object 200. The information processing apparatus 110 receives a video of the in-vehicle camera 201 from the moving object 200 via the network 150. The information processing apparatus 110 analyzes the received video of the in-vehicle camera 201, and watches whether a passenger is in a safe boarding state. The information processing apparatus 110 transmits a result of watching of a passenger to the moving object 200. The information processing apparatus 110 corresponds to the information processing apparatus 50 illustrated in FIG. 1.

The remote monitoring apparatus 130 is an apparatus that remotely monitors operation of the moving object 200. The information processing apparatus 110 may transmit a result of watching of a passenger to the remote monitoring apparatus 130, in addition to or instead of transmitting the result of watching of the passenger to the moving object 200. Note that, when it is not necessary to remotely monitor the operation of the moving object 200, the remote monitoring apparatus 130 can be omitted. In other words, the system 100 may not include the remote monitoring apparatus 130.

Figure 3:
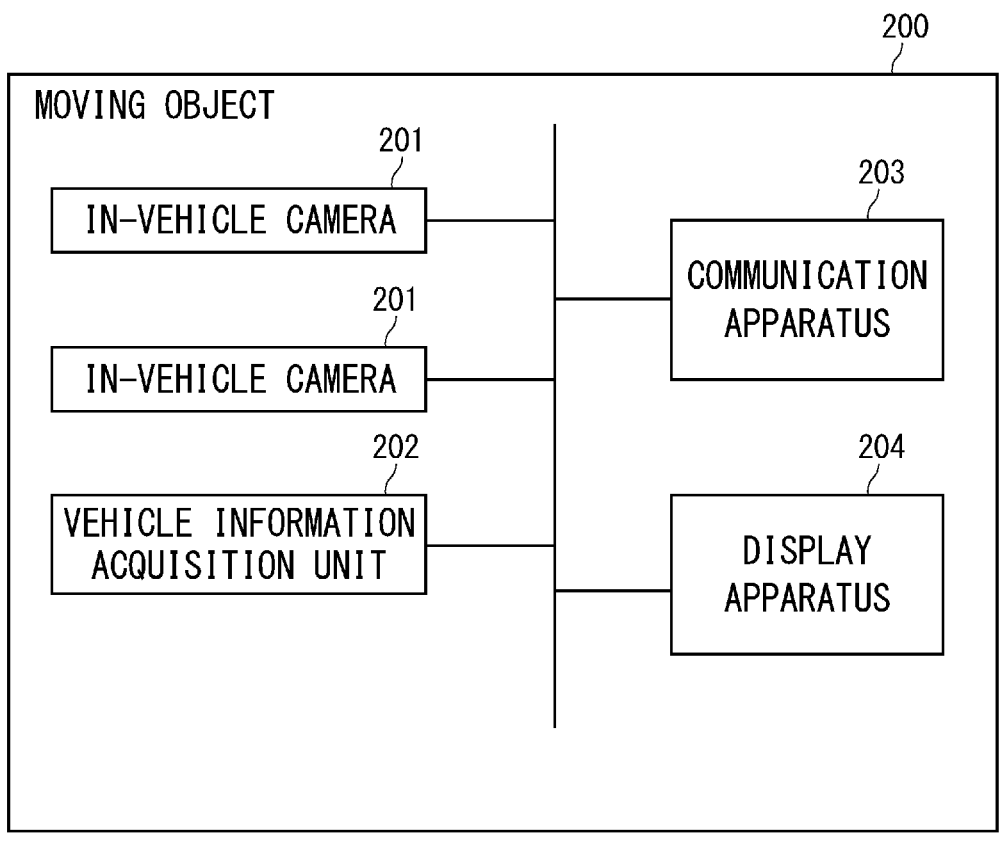
FIG. 3 is a block diagram illustrating a configuration example of a moving object.

FIG. 3 illustrates a configuration example of the moving object 200. The moving object 200 includes the one or more in-vehicle cameras 201, a vehicle information acquisition unit 202, a communication apparatus 203, and a display apparatus 204. In the moving object 200, these components are configured to be communicable with one another via an in-vehicle local area network (LAN), a controller area network (CAN), or the like.

Each of the in-vehicle cameras 201 is a camera that captures an image of inside of the moving object 200. In particular, the in-vehicle camera 201 captures an area in which a passenger boards. The in-vehicle camera 201 is disposed, for example, on a ceiling of a vehicle interior of the moving object 200. The vehicle information acquisition unit 202 acquires various kinds of information of the moving object 200. The vehicle information acquisition unit 202 acquires information such as a vehicle speed, a steering angle, an opening degree of an accelerator pedal, and a depression amount of a brake pedal from, for example, a vehicle sensor of the moving object 200. In addition, the vehicle information acquisition unit 202 acquires information such as an operation state of a direction indicator and an opening/closing state of a door.

The communication apparatus 203 is configured as an apparatus that performs wireless communication between the moving object 200 and the network 150 (refer to FIG. 2). The communication apparatus 203 includes an antenna for wireless communication, a transmitter, and a receiver. The communication apparatus 203 transmits a video of the in-vehicle camera 201 to the information processing apparatus 110 and the remote monitoring apparatus 130 via the network 150.

In addition, the communication apparatus 203 transmits various kinds of information of the moving object 200 to the information processing apparatus 110 and the remote monitoring apparatus 130 via the network 150. The communication apparatus 203 transmits, for example, the vehicle speed, the operation state of the direction indicator, and the opening/closing state of the door acquired by the vehicle information acquisition unit 202 as vehicle information to the information processing apparatus 110 and the remote monitoring apparatus 130. The communication apparatus 203 may transmit position information of the moving object 200 to the information processing apparatus 110 and the remote monitoring apparatus 130. Note that, information transmitted to the information processing apparatus 110 and information transmitted to the remote monitoring apparatus 130 may not be the same information.

The moving object 200 may include a peripheral monitoring sensor that monitors a peripheral situation of the moving object 200, which is not illustrated in FIG. 3. The peripheral monitoring sensor includes, for example, a camera, a radar, a light detection and ranging (LiDAR), or the like. The peripheral monitoring sensor may include, for example, a plurality of cameras that capture a front, a back, a right side, and a left side of the vehicle. The communication apparatus 203 may transmit a video or the like of outside of the vehicle acquired by the peripheral monitoring sensor to the remote monitoring apparatus 130 via the network 150. The remote monitoring apparatus 130 displays the video received from the moving object 200 and various kinds of information on a display apparatus. A monitoring person refers to the video and various kinds of information displayed on the display apparatus, and performs remote monitoring of the moving object 200.

Figure 4:
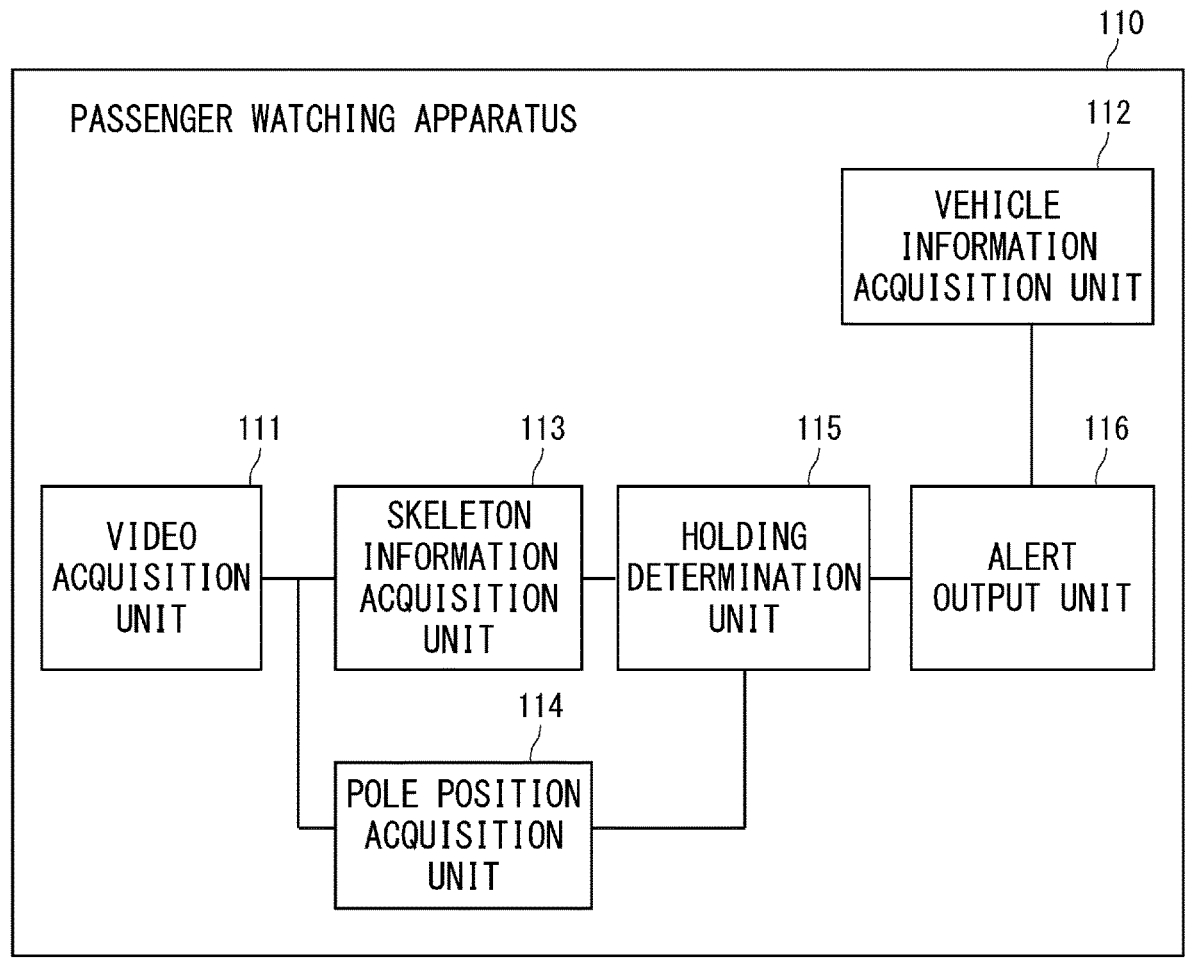
FIG. 4 is a block diagram illustrating a configuration example of an information processing apparatus.

FIG. 4 illustrates a configuration example of the information processing apparatus 110. The information processing apparatus 110, which is a passenger watching apparatus, includes a video acquisition unit 111, a vehicle information acquisition unit 112, a skeleton information acquisition unit 113, a pole position acquisition unit 114, a holding determination unit 115, and an alert output unit 116. The video acquisition unit 111 receives an in-vehicle video captured by using the in-vehicle camera 201 from the moving object 200. The vehicle information acquisition unit 112 receives vehicle information from the moving object 200. Each of the video acquisition unit 111 and the vehicle information acquisition unit 112 may receive the in-vehicle video and the vehicle information from a plurality of the moving objects 200.

The skeleton information acquisition unit 113 analyzes a video (image) of the in-vehicle camera 201, and acquires skeleton information of each of one or more passengers boarding on the vehicle. When the moving object 200 includes a plurality of in-vehicle cameras 201, the skeleton information acquisition unit 113 performs analysis on each of the videos of the plurality of in-vehicle cameras. For example, the skeleton information acquisition unit 113 estimates a two-dimensional skeleton structure of a person (passenger) in an image from the video (image) of the in-vehicle camera 201 acquired by the video acquisition unit 111. The skeleton information acquisition unit 113 estimates the skeleton structure for each passenger included in the image. For example, the skeleton information acquisition unit 113 detects a skeleton structure of each passenger, based on a feature such as a joint of each passenger, by using a skeleton estimation technique using machine learning. For example, a known skeleton estimation technique such as OpenPose may be used for detecting the skeleton structure. The skeleton information acquisition unit 113 corresponds to the skeleton information acquisition means 51 illustrated in FIG. 1.

Figure 5:
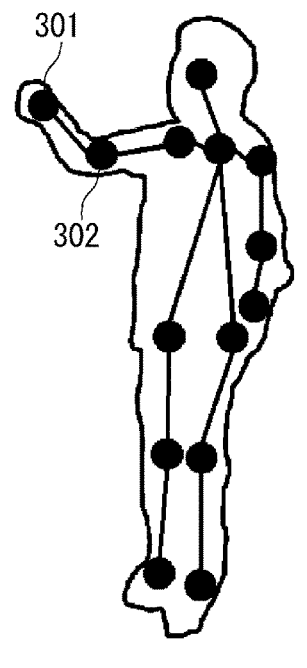
FIG. 5 is a schematic diagram illustrating one example of skeleton structure detected by a skeleton information acquisition unit.

FIG. 5 illustrates one example of a skeleton structure detected by the skeleton information acquisition unit 113. For example, the skeleton information acquisition unit 113 extracts an image of each passenger from an in-vehicle video of the moving object 200. The skeleton information acquisition unit 113 detects, as a skeleton structure, coordinate data of a joint point of a passenger from the extracted image. In FIG. 5, the detected joint points are indicated by black circles. The skeleton information acquisition unit 113 detects a position of a joint point 301 of a wrist and a position of a joint point 302 of an elbow in particular, from the detected skeleton structure. The skeleton information acquisition unit 113 acquires information indicating the skeleton structure of the passenger as skeleton information.

The pole position acquisition unit (pole position acquisition means) 114 acquires, as pole position information, information indicating a position of a pole existing inside of the moving object 200. The pole position acquisition unit 114 acquires pole position information from, for example, an in-vehicle video of the moving object 200. The pole position acquisition unit 114 identifies a region of a pole included in an in-vehicle video, for example, based on a color. In Japan, a "standard specification low-floor bus" determines that a specific color (orange color) is used for a color of a vertical grip bar (pole). The pole position acquisition unit 114 may identify a region of a bar-shaped object having an orange color as a region of a pole. For example, the pole position acquisition unit 114 may acquire the pole position information from an in-vehicle video in a state where a passenger is not boarding. Alternatively, the pole position acquisition unit 114 may read pre-registered pole position information from a not-illustrated storage device.

The holding determination unit 115 determines whether a passenger is holding a pole, based on the skeleton information of the passenger acquired by the skeleton information acquisition unit 113 and the pole position information acquired by the pole position acquisition unit 114. The holding determination unit 115 may further determine whether a passenger is holding at least one of a pole and a strap by further using positional information of the strap and the like. The holding determination unit 115 corresponds to the holding determination means 52 illustrated in FIG. 1.

For example, the holding determination unit 115 determines whether a passenger is holding a pole, based on a distance between the joint point 301 of the wrist (refer to FIG. 5) and the pole in an in-vehicle video. The holding determination unit 115 derives, for example, a shortest distance from the joint point 301 of the wrist to the pole. When the derived shortest distance is equal to or less than a predetermined distance threshold value, the holding determination unit 115 determines that the passenger is holding the pole.

The holding determination unit 115 may determine whether a passenger is holding a pole, based on a relationship between a position of the joint point 301 of the wrist and a position of the joint point 302 of the elbow, and a position of the pole. For example, the holding determination unit 115 estimates a range in which a palm exists, based on the position of the joint point 301 of the wrist and the position of the joint point 302 of the elbow. The holding determination unit 115 may estimate whether the passenger is holding the pole according to whether the pole exists in the estimated range.

Figure 6:
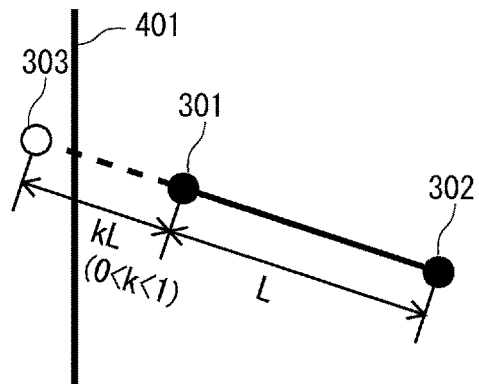
FIG. 6 is a schematic diagram illustrating an example in which whether a passenger is holding a pole is determined based on joint points of a wrist and an elbow, and a position of the pole.

FIG. 6 illustrates an example in which it is determined whether a passenger is holding a pole, based on the positions of the joint points of the wrist and elbow and the pole. The holding determination unit 115 derives a length L of a straight line connecting the joint point 301 of the wrist and the joint point 302 of the elbow. The holding determination unit 115 places a point 303, on a straight line passing through the joint point 301 of the wrist and the joint point 302 of the elbow, at a position separated from the joint point 301 of the wrist by a distance (kL) acquired by k times (0<k<1) the distance L on an opposite side of the joint point 302 of the elbow. The holding determination unit 115 estimates that a palm exists between the joint point 301 of the wrist and the point 303. The holding determination unit 115 determines whether a straight line connecting the joint point 301 of the wrist and the point 303 intersects a pole 401. When the pole

401 exists between the joint point 301 of the wrist and the point 303, the holding determination unit 115 determines that the passenger is holding the pole 401.

Figure 7:
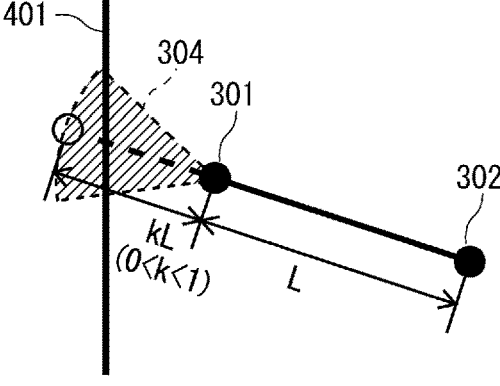
FIG. 7 is a schematic diagram illustrating another example in which whether a passenger is holding a pole is determined based on joint points of a wrist and an elbow, and a position of the pole.

FIG. 7 illustrates another example in which it is determined whether a passenger is holding a pole, based on the positions of the joint points of the wrist and elbow and the pole. In this example, the holding determination unit 115 sets a fan-shaped region 304 passing through the point 303 on the opposite side of the joint point 302 of the elbow, with the joint point 301 of the wrist as a base point. The holding determination unit 115 estimates that a palm exists in a range of the region 304. The holding determination unit 115 determines whether a part of the pole 401 is included in the region 304. When a part of the pole 401 is included in the region 304, the holding determination unit 115 determines that the passenger is holding the pole 401.

Figure 8:
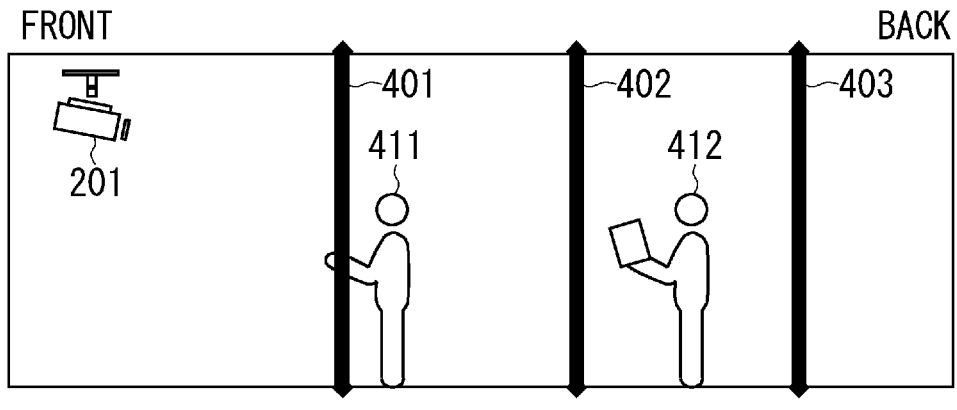
FIG. 8 is a schematic diagram schematically illustrating a passenger and a pole in a moving object.

Herein, in an in-vehicle video, a front pole and a back passenger may overlap with each other, and although the passenger does not actually hold the pole, a joint point of a wrist of the passenger and the pole may overlap with each other. FIG. 8 schematically illustrates a passenger and a pole in the moving object 200. Herein, it is assumed that there are three poles being poles 401 to 403 inside of the moving object 200. In addition, it is assumed that there are two passengers being passengers 411 and 412 in the moving object 200. It is assumed that the passenger 411 holds the pole 401. On the other hand, it is assumed that the passenger 412 has something in his/her hand and does not hold any pole. The in-vehicle camera 201 captures an image of the vehicle interior of the moving object 200 from the front of the moving object 200.

Figure 9:
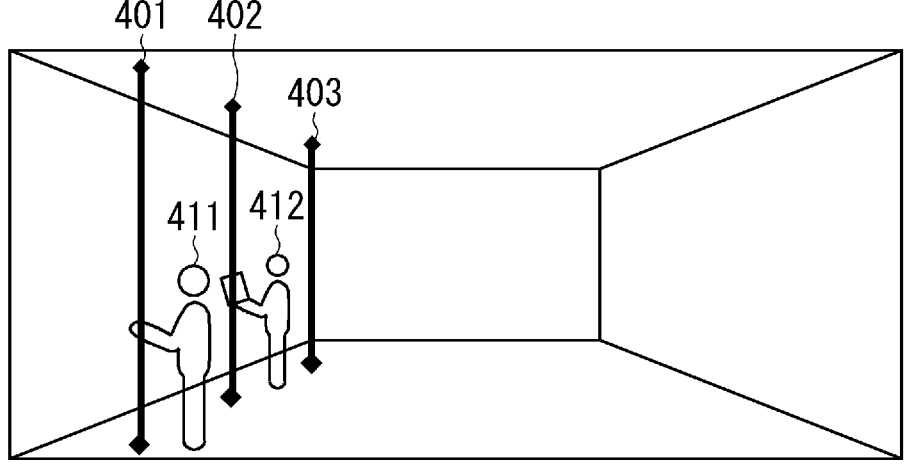
FIG. 9 is a schematic diagram schematically illustrating an in-vehicle video captured by an in-vehicle camera.

FIG. 9 schematically illustrates an in-vehicle video captured by the in-vehicle camera 201. In the example illustrated in FIG. 9, the passenger 411 is holding the pole 401, so that a joint point of a wrist is close to the pole 401. In this case, the holding determination unit 115 can determine that the passenger 411 is holding the pole 401, based on a distance between the joint point of the wrist and the pole 401. On the other hand, for the passenger 412, the passenger 412 does not hold the pole, but in the in-vehicle video, the vicinity of a wrist of the passenger 412 overlaps with the pole 402. Therefore, there is a possibility that the holding determination unit 115 erroneously determines that the passenger 412 is holding the pole 402.

In order to avoid the above-described erroneous determination, the holding determination unit 115 may extract a pole that can be held by each passenger among the poles inside the moving object 200, and determine whether each passenger is holding the extracted pole. The holding determination unit 115 specifies, for example, a position of each passenger on a floor of the vehicle interior of the moving object 200 and a position of each pole on the floor. For example, the holding determination unit 115 specifies the position of each passenger on the floor and the position of each pole on the floor by using floor information for identifying which part in the video corresponds to the floor. Alternatively, the position of each passenger on the floor can be specified from a video of the in-vehicle camera 201 by using an angle of view, a focal length, and the like of the in-vehicle camera 201. Similarly, the position of each pole on the floor can be specified from a video of the in-vehicle camera 201 by using the angle of view, the focal length, and the like of the in-vehicle camera 201. The position of each pole on the floor may be prepared in advance.

The holding determination unit 115 extracts a pole that can be held by each passenger, based on, for example, a positional relationship between the position of each passenger on the floor and the position of each pole on the floor. The holding determination unit 115 derives, for example, a distance between each passenger and each pole on the floor. The holding determination unit 115 extracts, from a position of a passenger on the floor, a pole existing in a range where an arm of the passenger reaches, as a pole that can be held by the passenger. The holding determination unit 115 may estimate a height of a passenger from an estimation result of the skeleton structure, and estimate a length of an arm of the passenger from the estimated height. When a pole does not exist in the range in which an arm of a passenger reaches, the holding determination unit 115 determines that there is no pole that the passenger can hold.

Figure 10:
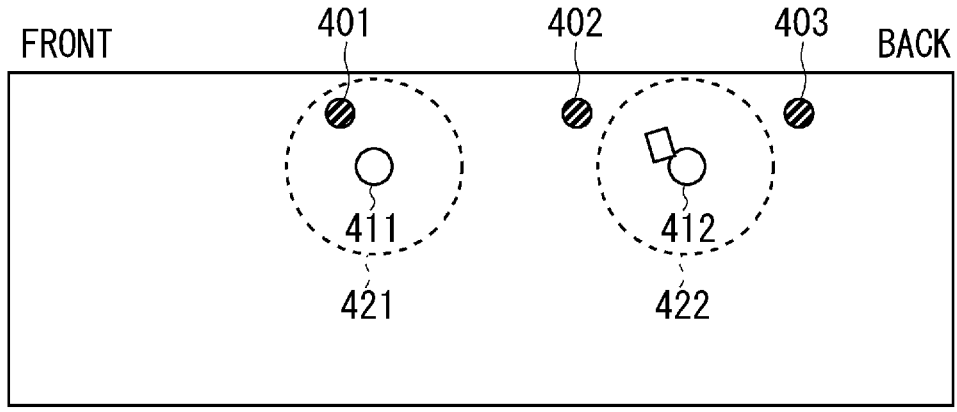
FIG. 10 is a schematic diagram schematically illustrating a positional relationship between a passenger and a pole on a floor.

FIG. 10 schematically illustrates a positional relationship between a passenger and a pole on a floor. For the passenger 411, the holding determination unit 115 sets, around the passenger 411, a range 421 in which an arm of the passenger 411 reaches according to an estimated arm length. The holding determination unit 115 extracts the pole 401 in which a position of the pole on the floor is included in the range 421 as a pole that can be held by the passenger 411. The holding determination unit 115 determines whether the passenger 411 is holding the pole 401, based on, for example, the position of the joint point of the wrist of the passenger 411 and the position of the pole 401. The holding determination unit 115 excludes the poles 402 and 403 from determination.

For the passenger 412, the holding determination unit 115 sets, around the passenger 412, a range 422 in which an arm of the passenger 412 reaches according to an estimated arm length. In FIG. 10, any of positions of the poles 401 to 403 on the floor is outside the range 422. In this case, the holding determination unit 115 determines that there is no pole that the passenger 412 can hold. As described above, by limiting a pole to be determined, based on a positional relationship between a passenger and the pole on the floor, erroneous determination can be suppressed even when the passenger and the pole overlap with each other on an in-vehicle video.

Note that, it is conceivable that a foot of a passenger standing on board is in contact with the floor. Therefore, it is conceivable that the holding determination unit 115 can specify a position of the passenger on the floor from an in-vehicle video. However, a pole may be fixed to a seat or a wall, and is not necessarily attached to the floor. When the pole is not attached to the floor, the holding determination unit 115 may virtually extend the pole in a direction of a floor surface, and thereby specify a position of the pole on the floor.

Figure 11:
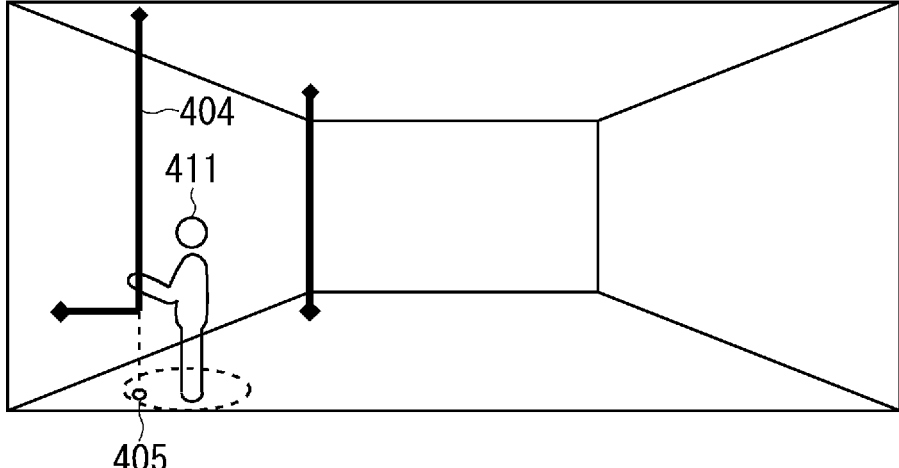
FIG. 11 is a schematic diagram schematically illustrating an in-vehicle video when a pole is not in contact with a floor.

FIG. 11 schematically illustrates an in-vehicle video when a pole is not in contact with a floor. In FIG. 11, a pole 404 is fixed to a ceiling and a side wall of the vehicle interior, and is not in contact with a floor surface. In this case, the holding determination unit 115 virtually extends a portion of the pole 404 in a vertical direction to the floor surface, and specifies an intersection point between the extended portion of the pole 404 and the floor surface, as a position 405 of the pole 404 on the floor. The holding determination unit 115 may determine whether the passenger 411 can hold the pole 404, based on a positional relationship between the position of the passenger 411 on the floor and the position 405.

Returning to FIG. 4, the alert output unit 116 acquires a determination result from the holding determination unit 115. The alert output unit 116 transmits, to the moving object 200, a warning indicating that there is a passenger in an unsafe pose when the passenger is determined to be standing in the moving object 200 and not holding a pole or the like. The alert output unit 116 may transmit information indicating a position of a passenger determined that the passenger is not holding the pole or the like to the moving object 200. The alert output 116 can transmit a warning to the remote monitoring apparatus 130, in addition to or instead of the moving object 200. The alert output unit 116 corresponds to the alert output means 53 illustrated in FIG. 1.

The alert output unit 116 may acquire vehicle information from the vehicle information acquisition unit 112, and determine whether a predetermined alert condition is satisfied, based on the vehicle information. For example, the alert output unit 116 specifies an operation state of the moving object 200, based on the vehicle information. The alert output unit 116 may determine whether the specified operation state indicates an operation state set as an alert condition. When the alert condition is satisfied, the alert output unit 116 may transmit a warning to the moving object 200 or the like.

For example, the alert output unit 116 specifies whether the moving object 200 is traveling, based on the vehicle information including the vehicle speed. The alert output unit 116 may transmit a warning to the moving object 200 when it is determined that there is a passenger who is not holding a pole or the like while the moving object 200 is traveling. In addition, the alert output unit 116 may specify whether to be immediately before the moving object 200 starts, based on the vehicle information including an opening/closing state of a door. The alert output unit 116 specifies, for example, that it is immediately before the moving object 200 starts, when the door is closed at a bus stop. The alert output unit 116 may transmit a warning to the moving object 200 when it is determined that there is a passenger who is not holding a pole or the like immediately before the moving object 200 starts.

In the moving object 200, the communication apparatus 203 (refer to FIG. 3) receives information indicating presence of a passenger in an unsafe pose, a position thereof, and the like. The display apparatus 204 displays presence of a passenger in an unsafe pose, a position thereof, and the like, and notifies a driver of the moving object 200 of danger. As necessary, the driver makes an announcement such as "please hold on to a handrail". Alternatively, the moving object 200 may make an announcement such as "please hold on to a handrail" by using a not-illustrated automatic broadcasting apparatus. The driver does not cause the moving object 200 to start until a passenger holds the handrail when danger is notified immediately before start.

Figure 12:
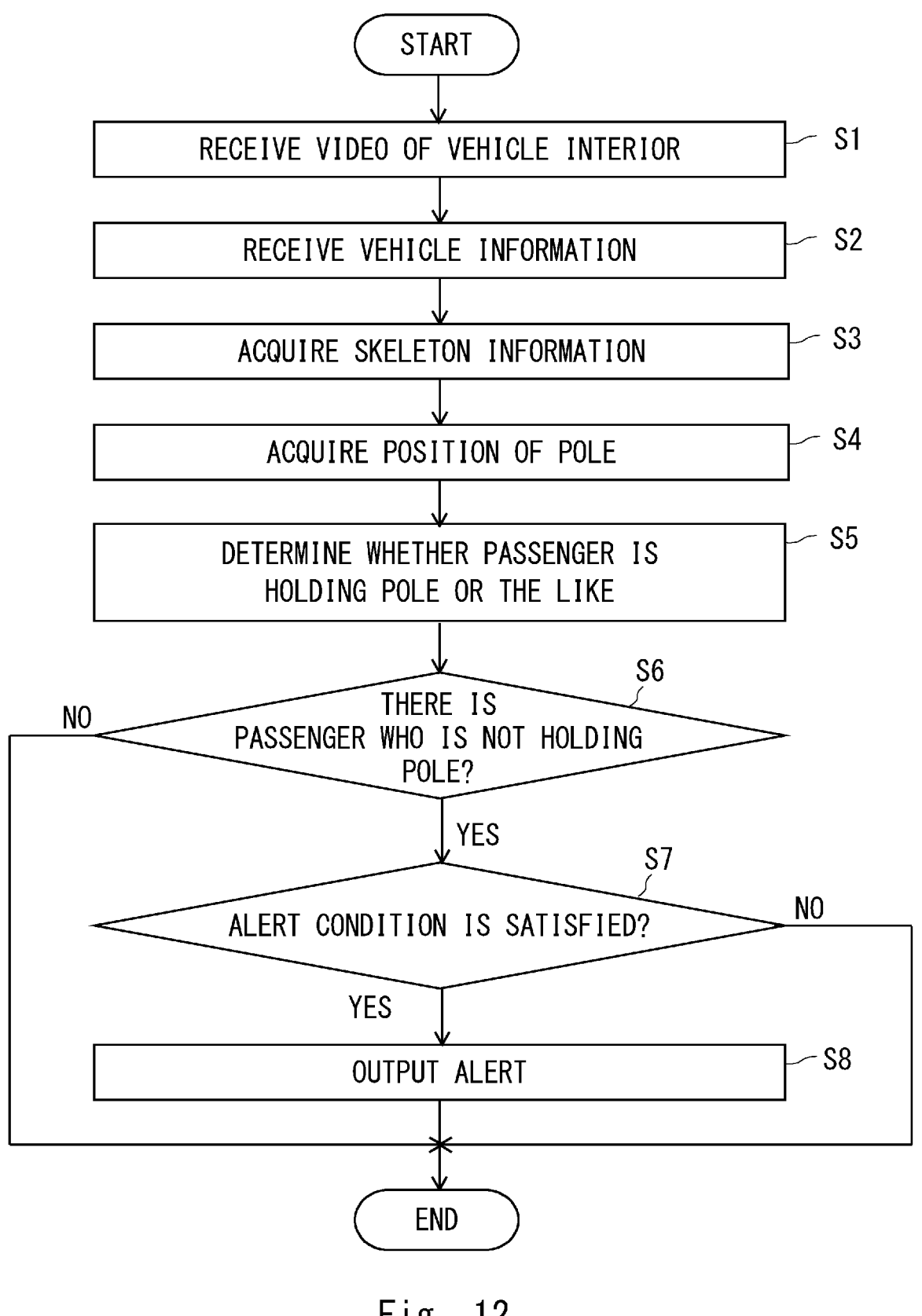
FIG. 12 is a flowchart illustrating an operation procedure in the information processing apparatus.

Next, an operation procedure will be described. FIG. 12 illustrates an operation procedure (information processing method) in the information processing apparatus (passenger watching apparatus) 110. The video acquisition unit 111 receives a video (in-vehicle video) of the in-vehicle camera 201 from the moving object 200 (step S1). The video acquisition unit 111 outputs the received video to the skeleton information acquisition unit 113 and the pole position acquisition unit 114. The vehicle information acquisition unit 112 receives vehicle information acquired by the vehicle information acquisition unit 202 (refer to FIG. 3) or the like from the moving object 200 (step S2). The vehicle information acquisition unit 112 outputs the received vehicle information to the alert output unit 116.

The skeleton information acquisition unit 113 acquires skeleton information of each passenger from the in-vehicle video received in step S1 (step S3). In step S3, the skeleton information acquisition unit 113 acquires, in particular, a position of a joint points of a wrist and a position of a joint point of an elbow of a passenger. The pole position acquisition unit 114 acquires a position of a pole from the in-vehicle video (step S4).

Based on the skeleton information acquired in step S3 and the position of the pole acquired in step S4, the holding determination unit 115 determines whether a passenger is holding a pole or the like (step S5). The holding determination unit 115 outputs a result of determination to the alert output unit 116.

Based on the result of the determination in step S5, the alert output unit 116 determines whether there is a passenger who is not holding a pole or the like (step S6). When the alert output unit 116 determines that there is no passenger who has not held a pole or the like, processing ends. The alert output unit 116 determines whether a predetermined alert condition is satisfied, based on the vehicle information received in step S2 (step S7). When determining that the predetermined alert condition is satisfied, the alert output unit 116 transmits a warning indicating presence of a passenger in an unsafe pose to the moving object 200 and the remote monitoring apparatus 130 (step S8). The passenger watching apparatus 110 repeatedly performs the processing from steps S1 to S8.

Note that, in the above-described operation procedure, a part of steps S1 to S8 is not necessarily performed in above-described order. For example, either step S1 or step S2 may be performed first. In addition, the vehicle information received in step S2 is used for determining whether the alert condition is satisfied in step S7. Therefore, step S2 may be performed at any timing from step S3 to immediately before step S7. Alternatively, step S2 may be performed in parallel with any of the steps from step S1 to step S6. In addition, either step S3 or step S4 may be performed first, or may be performed in parallel.

In the present example embodiment, the skeleton information acquisition unit 113 acquires skeleton information of a passenger from a video of the in-vehicle camera 201 of the moving object 200. The holding determination unit 115 determines whether a passenger is holding a pole by using the skeleton information of the passenger and position information of the pole. In the present example embodiment, whether a passenger is holding a pole is determined by using the skeleton information acquired from a video. In this way, even when a sensor such as a contact sensor or a pressure sensor is not installed at a plurality of places in a vehicle, the passenger watching apparatus 110 can determine whether a passenger is holding a pole or the like. In addition, in the present example embodiment, it is possible to find a passenger who is not holding a pole in the moving object 200 without depending on visual observation of a driver.

In the present example embodiment, the alert output unit 116 outputs an alert to the moving object 200 and the remote monitoring apparatus 130 when it is determined that a passenger is not holding a pole. When a passenger is not holding a pole or the like, a driver or the like of the moving object 200 is warned, so that the driver can know that there is a passenger who is not holding a pole without confirming by visual observation. The driver can cause the moving object 200 to reduce a risk of a passenger falling in the moving object 200, for example, by slowing down as needed or prompting the passenger to hold the pole. In addition, in the present example embodiment, the alert output unit 116 outputs an alert when a predetermined alert condition is satisfied. In this case, the alert output unit 116 can output an alert when a risk of occurring falling or the like is high when a passenger is not holding a pole.

Next, a second example embodiment of the present disclosure will be described. A configuration of a system according to the second example embodiment of the present disclosure may be similar to the configuration of the information processing apparatus (passenger watching apparatus) 110 described in the first example embodiment illustrated in FIG. 2. In the present example embodiment, a moving object is configured to be capable of autonomous driving. Other configurations may be similar to those described in the first example embodiment.

Figure 13:
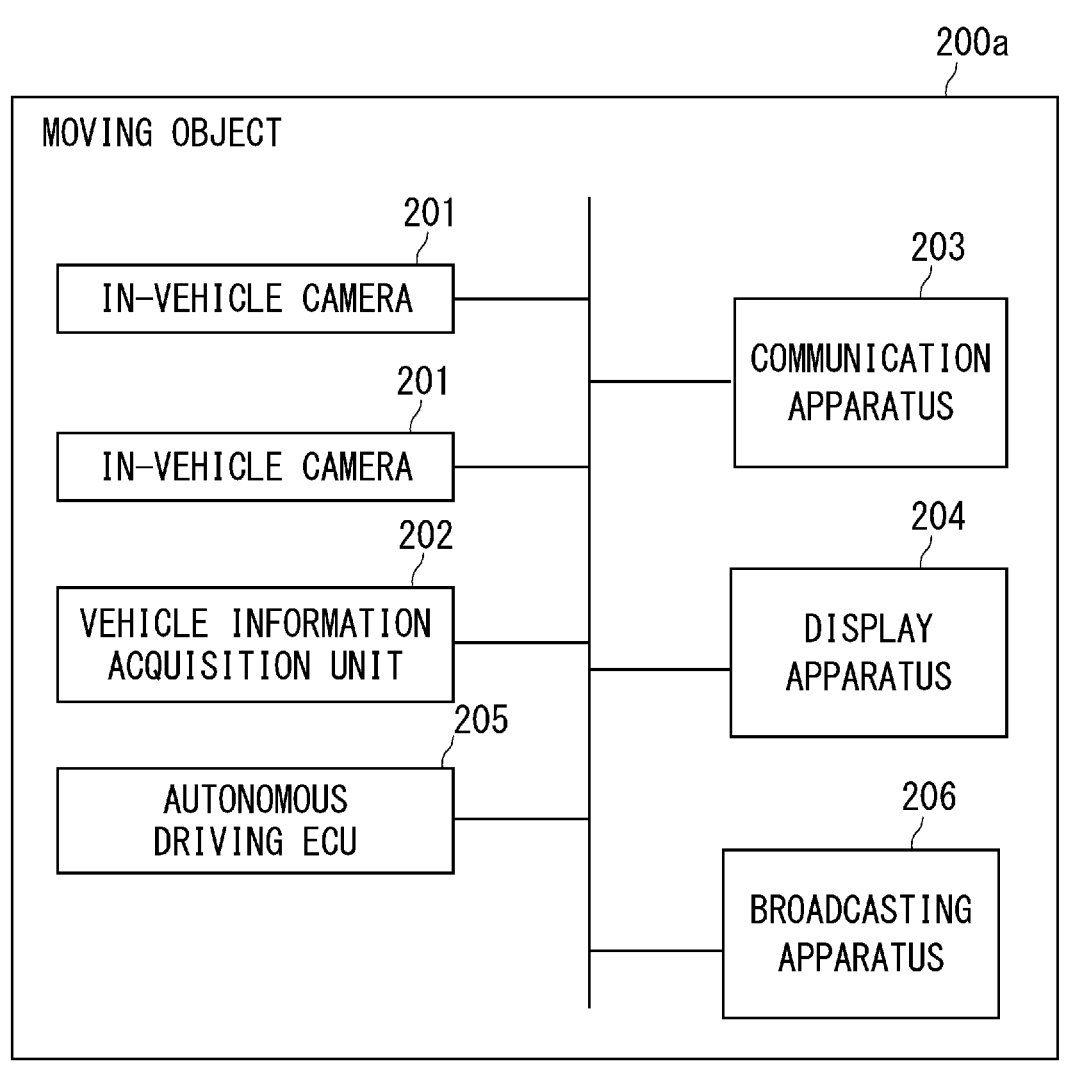
FIG. 13 is a block diagram illustrating a configuration of a moving object used in a second example embodiment.

FIG. 13 illustrates a configuration of a moving object used in the second example embodiment. In the present example embodiment, a moving object 200a includes an autonomous driving electric control unit (ECU) 205 and a broadcasting apparatus 206, in addition to the configuration of the moving object 200 used in the first example embodiment illustrated in FIG. 3. The autonomous driving ECU 205 is an electric control unit that controls autonomous driving of the moving object 200. The autonomous driving ECU 205 acquires sensor information from a not-illustrated peripheral monitoring sensor and a not-illustrated vehicle sensor, and controls autonomous traveling of the moving object 200, based on the acquired sensor information. The broadcasting apparatus 206 performs various types of broadcasting inside the moving object 200.

In the present example embodiment, an alert output unit 116 (refer to FIG. 4) of a passenger watching apparatus 110 outputs an alert to the moving object 200a and a remote monitoring apparatus 130. In the moving object 200a, a communication apparatus 203 receives an alert from the passenger watching apparatus 110. When an alert is received, the autonomous driving ECU 205 changes a parameter of autonomous driving from a parameter of the autonomous driving before the alert is received. For example, when an alert is received, the autonomous driving ECU 205 increases a safety level of the moving object 200. The autonomous driving ECU 205 lowers a speed of the moving object 200, for example, by increasing the safety level. Alternatively, a change in the speed of the moving object 200 is made gradual. The autonomous driving ECU 205 does not cause the moving object 200 to start when an alert is received while stopping at a bus stop or the like. When an alert is received, the broadcasting apparatus 206 makes an announcement such as "please hold on to a handrail", and prompts a passenger to hold a pole.

The remote monitoring apparatus 130 receives an alert from the passenger watching apparatus 110. When an alert is received, the remote monitoring apparatus 130 notifies a monitoring person that there is a passenger who is not holding a pole in the moving object 200a. The monitoring person can know that there is a passenger having a risk of falling in the moving object 200a. In this case, the monitoring person may switch driving of the moving object 200a from autonomous driving to remote driving, and remotely operate the moving object 200a.

In the present example embodiment, the moving object 200a is configured to be capable of autonomous driving. In the present example embodiment, when there is a passenger who is not holding a pole in the moving object 200a, an alert is output to the remote monitoring apparatus 130. In this way, a monitoring person can watch whether the moving object 200a to be performed autonomous driving is safely operated. In addition, when an alert is output, the broadcasting apparatus 206 broadcasts a passenger to hold a pole in the moving object 200a. When the passenger who has heard the broadcasting holds the pole, the moving object 200a can be safely operated.

Note that, in each of the above example embodiments, an example in which the passenger watching apparatus 110 is connected to the moving object 200 via the network 150 has been described. However, the present disclosure is not limited thereto. For example, the passenger watching apparatus 110 may be mounted on the moving object 200. In addition, the passenger watching apparatus 110 does not necessarily have to be configured as one apparatus, and may be configured by using a plurality of apparatuses. For example, the passenger watching apparatus 110 may be configured by using a first apparatus including the video acquisition unit 111, the skeleton information acquisition unit 113, and the pole position acquisition unit 114, and a second apparatus including the vehicle information acquisition unit 112, the holding determination unit 115, and the alert output unit 116. In that case, the first apparatus may be mounted on the moving object 200, and the second apparatus may be connected to the first apparatus via the network 150.

The passenger watching apparatus 110 may receive in-vehicle videos from a plurality of the moving objects 200, and determine whether a passenger is holding a pole for each moving object. In this case, in order to reduce a processing load in the passenger watching apparatus 110, at least a part of acquisition of skeleton information, acquisition of position information of a pole, and determination of holding may be performed in each moving object 200.

Figure 14:
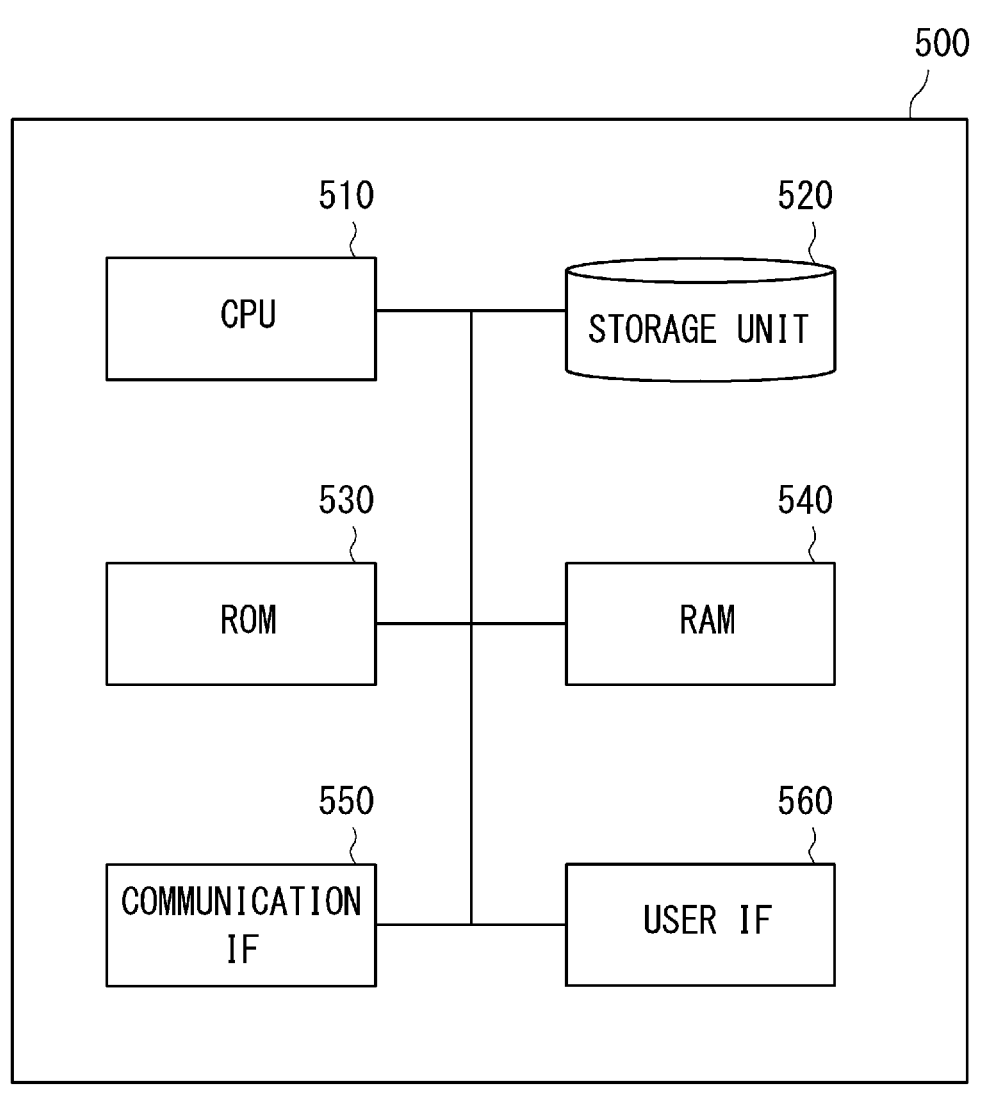
FIG. 14 is a block diagram illustrating a configuration example of a computer apparatus.

Next, a physical configuration of the passenger watching apparatus 110 will be described. In the present disclosure, the passenger watching apparatus 110 may be configured as a computer apparatus (server apparatus). FIG. 14 illustrates a configuration example of a computer apparatus that can be used as the passenger watching apparatus 110. A computer apparatus 500 includes a control unit (CPU: central processing unit) 510, a storage unit 520, a read only memory (ROM) 530, a random access memory (RAM) 540, a communication interface (IF) 550, and a user interface 560. The passenger watching apparatus 110 may be configured as an electronic control unit including the CPU 510, the ROM 530, and the RAM 540.

The communication interface 550 is an interface for connecting the computer apparatus 500 and a communication network with each other via a wired communication means, a wireless communication means, or the like. The user interface 560 includes, for example, a display unit such as a display. In addition, the user interface 560 includes an input unit such as a keyboard, a mouse, and a touch panel.

The storage unit 520 is an auxiliary storage device capable of holding various types of data. The storage unit 520 is not necessarily a part of the computer apparatus 500, and may be an external storage device or a cloud storage connected to the computer apparatus 500 via a network.

The ROM 530 is a non-volatile memory device. For example, a semiconductor memory apparatus such as a flash memory having a relatively small capacity is used for the ROM 530. A program executed by the CPU 510 may be stored in the storage unit 520 or the ROM 530. The storage unit 520 or the ROM 530 stores various programs for achieving a function of each unit in the passenger watching apparatus 110, for example.

The program can be stored by using various types of non-transitory computer-readable media, and supplied to the computing apparatus 500. The non-transitory computer-readable medium includes various types of tangible storage media. Examples of the non-transitory computer-readable medium include a magnetic recording medium such as, for example, a flexible disk, a magnetic tape, or a hard disk, a magneto-optical recording medium such as, for example, a magneto-optical disk, an optical disk medium such as a compact disc (CD) or a digital versatile disk (DVD), and a semiconductor memory such as a mask ROM, a programmable ROM (PROM), an erasable PROM (EPROM), a flash ROM, or a RAM. In addition, the program may also be supplied to a computer by using various types of transitory computer-readable media. Examples of the transitory computer-readable medium include an electric signal, an optical signal, and an electromagnetic wave. The transitory computer-readable medium can supply the program to the computer via a wired communication path such as an electric wire and an optical fiber, or a wireless communication path.

The RAM 540 is a volatile memory device. Various types of semiconductor memory devices such as a dynamic random access memory (DRAM) or a static random access memory (SRAM) are used for the RAM 540. The RAM 540 may be used as an internal buffer for temporarily storing data and the like. The CPU 510 loads a program stored in the storage unit 520 or the ROM 530 to the RAM 540, and executes the program. By the CPU 510 executing the program, the function of each unit in the passenger watching apparatus 110 can be achieved. The CPU 510 may include an internal buffer capable of temporarily storing data and the like.

While the example embodiments of the present disclosure have been described in detail above, the present disclosure is not limited to the above-described example embodiments, and changes and modifications to the above-described example embodiments without departing from the spirit of the present disclosure are also included in the present disclosure.

For example, some or all of the above-described example embodiments may be described as a supplementary note below, but are not limited thereto.

[Supplementary Note 1]

An information processing apparatus including:

skeleton information acquisition means for analyzing an in-vehicle video acquired from a camera configured to capture an image of a vehicle interior of a moving object, and acquiring skeleton information of each of one or more passengers boarding on the moving object;

holding determination means for determining whether the passenger is holding a pole, based on skeleton information of the passenger and a position of the pole in the moving object; and alert output means for outputting an alert when determining that the passenger is not holding the pole.

[Supplementary Note 2]

The information processing apparatus according to Supplementary note 1, wherein the skeleton information includes information indicating a position of a joint point of a wrist of the passenger.

[Supplementary Note 3]

The information processing apparatus according to Supplementary note 2, wherein the holding determination means determines that the passenger is holding the pole when a shortest distance from the joint point of the wrist to the pole in the in-vehicle video is equal to or less than a threshold value.

[Supplementary Note 4]

The information processing apparatus according to Supplementary note 2 or 3, wherein the skeleton information acquisition means estimates skeleton structure of the passenger, based on the in-vehicle video, and detects a position of the joint point of the wrist, based on the estimated skeleton structure.

15

[Supplementary Note 5]

The information processing apparatus according to Supplementary note 2, wherein the skeleton information further includes information indicating a position of a joint point of an elbow of the passenger, and the holding determination means determines that the passenger is holding the pole, when the pole exists, in the in-vehicle video, between a point, on a straight line passing through the joint point of the elbow and the joint point of the wrist, being separated from the joint point of the wrist, on an opposite side of the joint point of the elbow, by a distance acquired by multiplying a distance between the joint point of the elbow and the joint point of the wrist by a predetermined coefficient, and the joint point of the wrist.

[Supplementary Note 6]

The information processing apparatus according to Supplementary note 2, wherein the skeleton information further includes information indicating a position of a joint point of an elbow of the passenger, and the holding determination means determines that the passenger is holding a pole, when a part of the pole exists, in the in-vehicle video, in a fan-shaped region passing through a point separated, on an opposite side of the joint point of the elbow, by a distance acquired by multiplying a distance between the joint point of the elbow and the joint point of the wrist by a predetermined coefficient, with the joint point of the wrist as a base point.

[Supplementary Note 7]

The information processing apparatus according to Supplementary note 5 or 6, wherein the skeleton information acquisition means estimates skeleton structure of the passenger, based on the in-vehicle video, and detects a position of the joint point of the elbow and a position of the joint point of the wrist, based on the estimated skeleton structure.

[Supplementary Note 8]

The information processing apparatus according to any one of Supplementary notes 1 to 7, further including pole position acquisition means for acquiring a position of the pole, based on the in-vehicle video.

[Supplementary Note 9]

The information processing apparatus according to Supplementary note 8, wherein the pole position acquisition means identifies a region of the pole in the in-vehicle video by using color information, and detects a position of the pole.

[Supplementary Note 10]

The information processing apparatus according to any one of Supplementary notes 1 to 9, wherein the holding determination means specifies a position of the passenger and a position of the pole on a floor of the vehicle interior of the moving object, extracts a pole that can be held by the passenger, based on a positional relationship between a position of the passenger on the floor and a position of the pole on the floor, and determines whether the passenger is holding the extracted pole.

[Supplementary Note 11]

The information processing apparatus according to Supplementary note 10, wherein the holding determination means extracts, by a position of the passenger on the floor, a pole existing in a range in which an arm of the passenger reaches, as a pole that the passenger can hold.

16

[Supplementary Note 12]

The information processing apparatus according to Supplementary note 11, wherein the holding determination means estimates a height of the passenger, based on the skeleton information, and sets a range in which an arm of the passenger reaches according to the estimated height of the passenger.

[Supplementary Note 13]

The information processing apparatus according to any one of Supplementary notes 10 to 12, wherein, when the pole is not attached to a floor of the vehicle interior in the in-vehicle video, the holding determination means extends the pole in a direction of the floor, and estimates a position of the pole on the floor.

[Supplementary Note 14]

The information processing apparatus according to any one of Supplementary notes 1 to 13, wherein the alert output means determines whether a predetermined alert condition is satisfied, based on vehicle information received from the moving object, and outputs the alert when the holding determination means determines that the passenger is not holding the pole and also it is determined that the alert condition is satisfied.

[Supplementary Note 15]

The information processing apparatus according to Supplementary note 14, wherein the vehicle information includes information indicating a speed of the moving object, and the alert output means determines whether the moving object is traveling, based on the vehicle information, and determines that the alert condition is satisfied when determining that the moving object is traveling.

[Supplementary Note 16]

The information processing apparatus according to Supplementary note 14 or 15, wherein the vehicle information includes information indicating an opening/closing state of a door of the moving object, and the alert output means determines whether a door is closed in the moving object, based on the vehicle information, and determines that the alert condition is satisfied when determining that the door is closed.

[Supplementary Note 17]

The information processing apparatus according to any one of Supplementary notes 1 to 16, wherein the alert output means outputs the alert to the moving object.

[Supplementary Note 18]

The information processing apparatus according to any one of Supplementary notes 1 to 17, wherein the alert output means outputs the alert to a remote monitoring apparatus that remotely monitors the moving object.

[Supplementary Note 19]

A system including:

a moving object including a camera configured to capture an image of a vehicle interior; and an information processing apparatus configured to monitor a passenger of the moving object, wherein the information processing apparatus includes skeleton information acquisition means for analyzing an in-vehicle video acquired from the camera, and acquiring skeleton information of each of one or more passengers boarding on the moving object, holding determination means for determining whether the passenger is holding a pole, based on skeleton information of the passenger and a position of the pole in the moving object, and alert output means for outputting an alert when it is determined that the passenger is not holding the pole.

[Supplementary Note 20]

The system according to Supplementary note 19, wherein the skeleton information includes information indicating a position of a joint point of a wrist of the passenger, and the holding determination means determines that the passenger is holding the pole when a shortest distance from the joint point of the wrist to the pole in the in-vehicle video is equal to or less than a threshold value.

[Supplementary Note 21]

The system according to Supplementary note 19, wherein the skeleton information includes information indicating a position of a joint point of a wrist of the passenger and information indicating a position of a joint point of an elbow of the passenger, and the holding determination means determines that the passenger is holding the pole, when the pole exists, in the in-vehicle video, between a point, on a straight line passing through the joint point of the elbow and the joint point of the wrist, being separated from the joint point of the wrist, on an opposite side of the joint point of the elbow, by a distance acquired by multiplying a distance between the joint point of the elbow and the joint point of the wrist by a predetermined coefficient, and the joint point of the wrist.

[Supplementary Note 22]

The system according to Supplementary note 19, wherein the skeleton information includes information indicating a position of a joint point of a wrist of the passenger and information indicating a position of a joint point of an elbow of the passenger, and the holding determination means determines that the passenger is holding a pole, when a part of the pole exists, in the in-vehicle video, in a fan-shaped region passing through a point separated, on an opposite side of the joint point of the elbow, by a distance acquired by multiplying a distance between the joint point of the elbow and the joint point of the wrist by a predetermined coefficient, with the joint point of the wrist as a base point.

[Supplementary Note 23]

The system according to any one of Supplementary notes 19 to 22, wherein the alert output means outputs an alert to the moving object.

[Supplementary Note 24] The system according to Supplementary note 23, wherein, when the moving object is configured to be capable of autonomous driving and the moving object is driven by autonomous driving, and when the alert is output from the alert output means, a parameter of the autonomous driving is changed from a parameter of autonomous driving before the alert is output.

[Supplementary Note 25]

The system according to any one of Supplementary notes 19 to 24, further including a remote monitoring apparatus configured to remotely monitor the moving object, wherein the alert output means outputs an alert to the remote monitoring apparatus.

[Supplementary Note 26]

An information processing method including:

analyzing an in-vehicle video acquired from a camera configured to capture an image of a vehicle interior of a moving object, and acquiring skeleton information of each of one or more passengers boarding on the moving object;

determining whether the passenger is holding a pole, based on skeleton information of the passenger and a position of the pole in the moving object; and outputting an alert when determining that the passenger is not holding the pole.

[Supplementary Note 27]

A non-transitory computer-readable medium storing a program for causing a processor to execute processing of:

analyzing an in-vehicle video acquired from a camera configured to capture an image of a vehicle interior of a moving object, and acquiring skeleton information of each of one or more passengers boarding on the moving object;

determining whether the passenger is holding a pole, based on skeleton information of the passenger and a position of the pole in the moving object; and outputting an alert when determining that the passenger is not holding the pole.

REFERENCE SIGNS LIST

10 SYSTEM
30 MOVING OBJECT
31 CAMERA
50 INFORMATION PROCESSING APPARATUS
51 SKELETON INFORMATION ACQUISITION MEANS
52 HOLDING DETERMINATION MEANS
53 ALERT OUTPUT MEANS
100 SYSTEM
110 INFORMATION PROCESSING APPARATUS (PASSENGER WATCHING APPARATUS)
111 VIDEO ACQUISITION UNIT
112 VEHICLE INFORMATION ACQUISITION UNIT
113 SKELETON INFORMATION ACQUISITION UNIT
114 POLE POSITION ACQUISITION UNIT
115 HOLDING DETERMINATION UNIT
116 ALERT OUTPUT UNIT
130 REMOTE MONITORING APPARATUS
200 MOVING OBJECT
201 IN-VEHICLE CAMERA
202 VEHICLE INFORMATION ACQUISITION UNIT
203 COMMUNICATION APPARATUS
204 DISPLAY APPARATUS
205 AUTONOMOUS DRIVING ECU
206 BROADCASTING APPARATUS
301 JOINT POINT OF WRIST
302 JOINT POINT OF ELBOW
401 TO 404 POLE
411, 412 PASSENGER

What is claimed is:

1. An information processing apparatus comprising:

a memory storing instructions; and a processor configured to execute the instructions to:

by analyzing an in-vehicle video acquired from a camera configured to capture an image of a vehicle interior of a moving object, acquire skeleton information of each of one or more passengers boarding on the moving object, the skeleton information including information indicating a position of a joint point of a wrist of the passenger;

determine whether the passenger is holding a pole, based on skeleton information of the passenger and a position of the pole in the moving object;

output an alert when it is determined that the passenger is not holding the pole; and control a parameter for autonomous driving of the moving object based on whether the passenger is holding the pole, wherein the processor is configured to execute the instructions to determine that the passenger is holding the pole in a case where a shortest distance from the joint point of the wrist to the pole in the in-vehicle video is equal to or less than a threshold value.

2. The information processing apparatus according to claim 1, wherein the processor is configured to execute the instructions to estimate skeleton structure of the passenger, based on the in-vehicle video, and detect the position of the joint point of the wrist, based on the estimated skeleton structure.

3. The information processing apparatus according to claim 1, wherein the skeleton information further includes information indicating a position of a joint point of an elbow of the passenger, and the processor is configured to execute the instructions to determine that the passenger is holding the pole, when the pole exists, in the in-vehicle video, between a point, on a straight line passing through the joint point of the elbow and the joint point of the wrist, being separated from the joint point of the wrist, on an opposite side of the joint point of the elbow, by a distance acquired by multiplying a distance between the joint point of the elbow and the joint point of the wrist by a predetermined coefficient, and the joint point of the wrist.

4. The information processing apparatus according to claim 3, wherein the processor is configured to execute the instructions to estimate skeleton structure of the passenger, based on the in-vehicle video, and detect a position of the joint point of the elbow and the position of the joint point of the wrist, based on the estimated skeleton structure.

5. The information processing apparatus according to claim 1, wherein the skeleton information further includes information indicating a position of a joint point of an elbow of the passenger, and the processor is configured to execute the instructions to determine that the passenger is holding a pole, when a part of the pole exists, in the in-vehicle video, in a fan-shaped region passing through a point separated, on an opposite side of the joint point of the elbow, by a distance acquired by multiplying a distance between the joint point of the elbow and the joint point of the wrist by a predetermined coefficient, with the joint point of the wrist as a base point.

6. The information processing apparatus according to claim 1, the processor is further configured to execute the instructions to acquire a position of the pole, based on the in-vehicle video.

7. The information processing apparatus according to claim 6, wherein the processor is configured to execute the instructions to identify a region of the pole in the in-vehicle video by using color information, and detects a position of the pole.

8. The information processing apparatus according to claim 1, the processor is configured to execute the instructions to specify a position of the passenger and a position of the pole on a floor of the vehicle interior of the moving object, extract a pole that can be held by the passenger, based on a positional relationship between a position of the passenger on the floor and a position of the pole on the floor, and determines whether the passenger is holding the extracted pole.

9. The information processing apparatus according to claim 8, wherein the processor is configured to execute the instructions to extract, by a position of the passenger on the floor, a pole existing in a range in which an arm of the passenger reaches, as a pole that the passenger can hold.

10. The information processing apparatus according to claim 9, wherein the processor is configured to execute the instructions to estimate a height of the passenger, based on the skeleton information, and set a range in which an arm of the passenger reaches according to the estimated height of the passenger.

11. The information processing apparatus according to claim 8, wherein, when the pole is not attached to a floor of the vehicle interior in the in-vehicle video, the processor is configured to execute the instructions to expand the pole in a direction of the floor, and estimate a position of the pole on the floor.

12. The information processing apparatus according to claim 1, wherein the processor is configured to execute the instructions to determine whether a predetermined alert condition is satisfied, based on vehicle information received from the moving object, and output the alert when it is determined that the passenger is not holding the pole and the alert condition is satisfied.

13. The information processing apparatus according to claim 12, wherein the vehicle information includes information indicating a speed of the moving object, and the processor is configured to execute the instructions to determine whether the moving object is traveling, based on the vehicle information, and determine that the alert condition is satisfied when determining that the moving object is traveling.

14. The information processing apparatus according to claim 12, wherein the vehicle information includes information indicating an opening/closing state of a door of the moving object, and the processor is configured to execute the instructions to determine whether a door is closed in the moving object, based on the vehicle information, and determine that the alert condition is satisfied when determining that the door is closed.

15. The information processing apparatus according to claim 1, wherein the alert output means outputs the alert to the moving object.

16. A system comprising:

a moving object including a camera configured to capture an image of a vehicle interior; and the information processing apparatus according to claim 1.

17. An information processing method comprising:

by analyzing an in-vehicle video acquired from a camera configured to capture an image of a vehicle interior of a moving object, acquiring skeleton information of each of one or more passengers boarding on the moving object, the skeleton information including information indicating a position of a joint point of a wrist of the passenger;

determining whether the passenger is holding a pole, based on skeleton information of the passenger and a position of the pole in the moving object;

outputting an alert when determining that the passenger is not holding the pole;

controlling a parameter for autonomous driving of the moving object based on whether the passenger is holding the pole; and determining that the passenger is holding the pole in a case where a shortest distance from the joint point of the wrist to the pole in the in-vehicle video is equal to or less than a threshold value.

18. A non-transitory computer-readable medium storing a program for causing a processor to execute processing of:

by analyzing an in-vehicle video acquired from a camera configured to capture an image of a vehicle interior of a moving object, acquiring skeleton information of each of one or more passengers boarding on the moving object, the skeleton information including information indicating a position of a joint point of a wrist of the passenger;

determining whether the passenger is holding a pole, based on skeleton information of the passenger and a position of the pole in the moving object;

outputting an alert when determining that the passenger is not holding the pole;

controlling a parameter for autonomous driving of the moving object based on whether the passenger is holding the pole; and determining that the passenger is holding the pole in a case where a shortest distance from the joint point of the wrist to the pole in the in-vehicle video is equal to or less than a threshold value.

* * * * *